United States Patent
Carbone et al.

(10) Patent No.: US 7,065,649 B2
(45) Date of Patent: Jun. 20, 2006

(54) METHOD AND SYSTEM FOR CONTROLLING USE OF SOFTWARE PROGRAMS

(75) Inventors: Giancarlo Carbone, Rome (IT); Thomas Frank Cierech, Ringwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 09/965,012

(22) Filed: Sep. 27, 2001

(65) Prior Publication Data

US 2004/0015962 A1    Jan. 22, 2004

(30) Foreign Application Priority Data

Mar. 23, 2001 (GB) .................................. 0107321.2

(51) Int. Cl.
H04L 9/00 (2006.01)

(52) U.S. Cl. .......................... 713/176; 713/2; 713/168

(58) Field of Classification Search .................... 713/1, 713/2, 164–167, 189, 190, 193, 200, 300, 713/340, 176, 155–156, 161, 168, 170–171; 717/168–178; 709/225; 710/18, 23, 240
See application file for complete search history.

(56) References Cited

U.S. PATENT DOCUMENTS 3,996,449 A    12/1976  Attanasio et al.
5,448,045 A *   9/1995  Clark ........................ 235/382
5,892,902 A *   4/1999  Clark ........................ 713/201
6,141,756 A *  10/2000  Bright et al. ............... 713/200
6,185,678 B1*   2/2001  Arbaugh et al. ............. 713/2
6,189,100 B1*   2/2001  Barr et al. ................. 713/182
6,292,900 B1*   9/2001  Ngo et al. .................. 713/200
6,684,326 B1*   1/2004  Cromer et al. ............... 713/2

FOREIGN PATENT DOCUMENTS

WO    WO 01/24012 A1    4/2001
WO    WO 01/59564 A2    8/2001

* cited by examiner

Primary Examiner—Antony Nguyen-Ba
(74) Attorney, Agent, or Firm—Jeffrey S. LaBaw; Dillon & Yudell LLP

(57) ABSTRACT

A method (300) and system for controlling use of software programs on a client workstation; the programs (such as an operating system or a network stack) are started before completion of a bootstrap process. Each program requests (311) an execution authorization to a system agent of a licensing management system, which grants (318–324) the authorization according to a verification of a (simplified) local license certificate for the program stored on the client workstation before completion of the bootstrap. A full-function agent of the licensing management system revises (342–351) the granted authorization according to a verification of a license certificate stored on a server workstation after completion of the bootstrap. Preferably, an execution environment of the programs (such as a power of the CPU on the client workstation) is monitored (333) in order to revise (336,360–384) compliance of the conditions of use of the programs with the respective license certificates dynamically.

21 Claims, 5 Drawing Sheets

METHOD AND SYSTEM FOR CONTROLLING USE OF SOFTWARE PROGRAMS

FIELD OF INVENTION

The present invention relates to a method and system for controlling use of software programs.

BACKGROUND OF THE INVENTION

Software programs running on a computer can be perfectly reproduced in an infinite number of copies. This is a major concern for publishers of the programs wishing to protect their intellectual property rights; as a matter of fact, the publishers typically receive a royalty for a licensed use of each program, so that any unaccounted use or distribution of the program results in an unpaid royalty. The problem has been exacerbated in the last years by the widespread diffusion of the INTERNET, which further facilitates the uncontrolled distribution of this kind of products.

The most straightforward way of avoiding unaccounted usage of the programs is that of preventing unauthorized copying and transmission. For example, most programs embed control code that limits the number of copies that can be made or disables operation of the programs after a predetermined period of time has lapsed. Another technique consists of requiring possession of a software or hardware key for running the programs.

A different solution proposed in the art is that of installing a licensing management system on the computer, which system controls compliance of the programs running on the computer with respective conditions of use authorised by the publisher (for example defining the maximum computational power of the computer on which the program can run). More specifically, the authorised conditions of use for each program (translated into machine-readable form) are embedded into a digital license certificate. The program includes a call to the licensing management system, so that each time an end-user requires execution of the program a corresponding request is transferred to the licensing management system. The licensing management system verifies whether the running of the program falls within the limits set out by the authorised conditions of use embedded in the license certificate; the licensing management system enables or prevents execution of the program according to the result of the verification.

However, the solution described above is not completely satisfactory. Particularly, running of the licensing management system requires the full function of an operating system and other programs providing basic services for the computer. Therefore, each time the computer is switched on a bootstrap process is at first executed, during which the basic programs are loaded. Once the bootstrap has been completed, providing a software platform on top of which other programs can run, the licensing management system can be started.

As a consequence, all the basic programs that are loaded during the bootstrap process (such as the operating system itself, a network stack, and the like) cannot be monitored by the licensing management system. This prevents carrying out a full control of the programs running on the computer. The aforementioned drawback is particularly critical, since the programs escaping the control are generally of a great worth. Therefore, the economic lost suffered by the publishers of the programs may be considerable.

It is an object of the present invention to overcome the above-mentioned drawbacks. In order to achieve this object, a method as set out in claims 1 and 10 is proposed.

DISCLOSURE OF THE INVENTION

Briefly, the present invention provides a method of controlling use of software programs on a computer including the steps of starting a bootstrap involving loading at least one software program providing basic services for the computer, and requesting an execution authorisation by each program to a licensing management system; the method further includes the steps of granting the authorisation according to a preliminary verification of licensing information indicative of an authorised condition of use of the program before completion of the bootstrap, and revising the granted authorisation according to a complete verification of the licensing information after completion of the bootstrap.

Alternatively, the present invention provides a method of controlling use of software programs on a computer including the steps of requesting an execution authorisation by each program to a licensing management system, and granting the authorisation according to a verification of licensing information indicative of an authorised condition of use of the program; the method further includes the steps of monitoring operation of the computer for detecting a change in an execution environment of the program, and revising the granted authorisation according to the detected change.

Moreover, the present invention also provides computer programs for performing these methods, products storing the programs, and corresponding systems for controlling use of the software programs.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
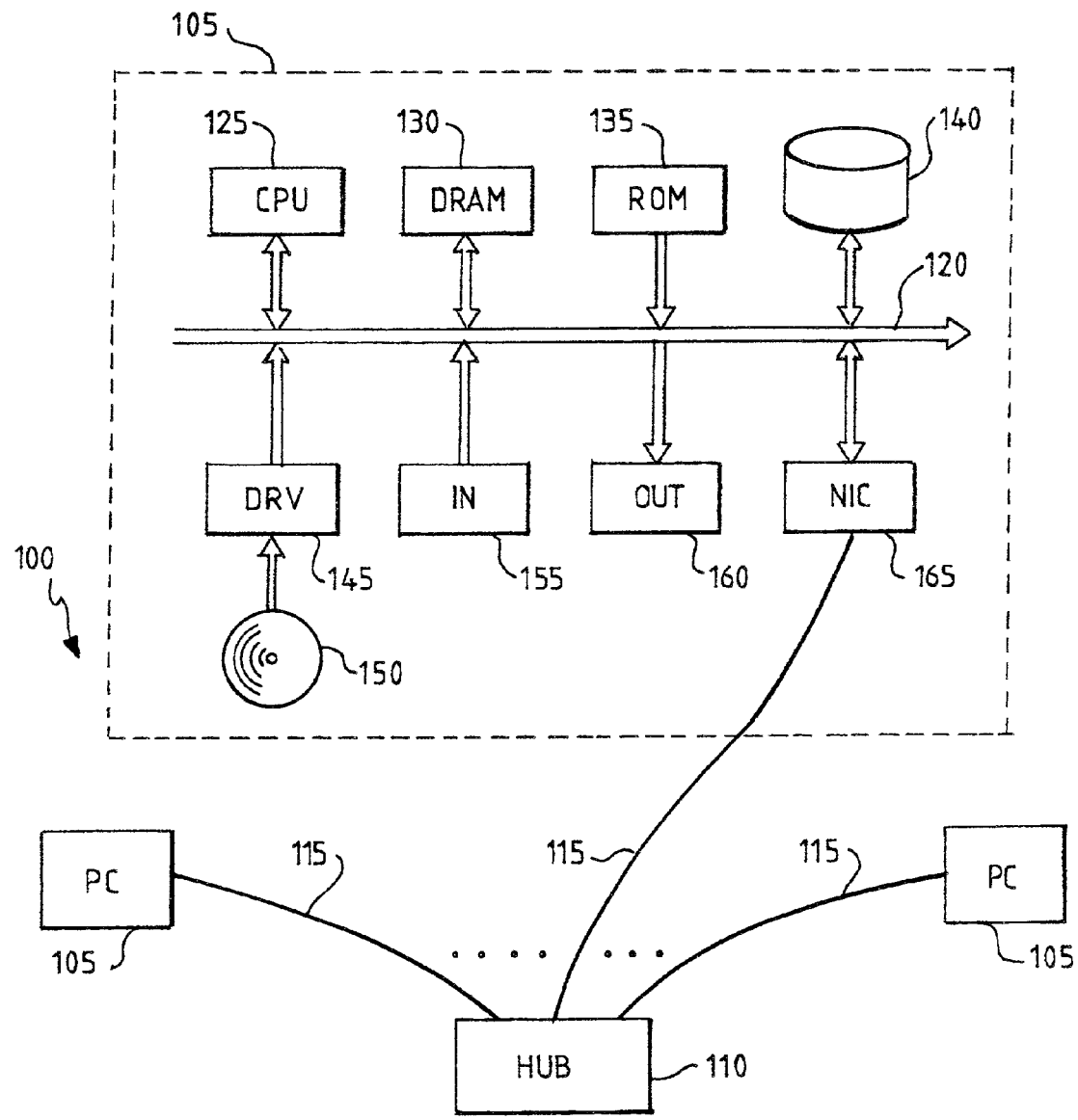
FIG. 1 is a basic block diagram of a networking system in which the method of the invention can be used.

With reference in particular to FIG. 1, there is shown a networking system 100, such as a LAN (Local Area Network). The LAN 100 if formed by a plurality of workstations 105, typically consisting of PCs (Personal Computers). The workstations 105 are connected to one or more concentrators 110 (such as hubs) through respective communication cables 115. The networking system 100 has a client/server architecture, wherein one or more of the workstations 105 (generally consisting of powerful computers) manage network resources, such as shared files and devises; the other workstations 105 operate as clients on which users run applications relying on server resources.

Each workstation 105 includes several units, which are connected in parallel to a communication bus 120. In particular, a central processing unit (CPU) 125 controls operation of the workstation 105, a working memory 130

(typically a DRAM) is used directly by the CPU 125, and a read-only memory (ROM) 135 stores a basic program for starting the workstation 105. Various peripheral units are further connected to the bus 120 (by means of respective interfaces). Particularly, a bulk memory consists of a hard-disk 140 and of a driver unit (DRV) 145 for reading CD-ROMs 150; the workstation 105 further includes an input unit (IN) 155, which consists for example of a keyboard and a mouse, and an output unit (OUT) 160, which consists for example of a monitor. A network interface card (NIC) 165 is used to connect the workstation 105 to the concentrator 110 (through the communication cable 115).

Similar considerations apply if the networking system consists of a WAN (Wide Area Network), if the networking system includes different components (such as one or more switches), if each workstation has a different structure (for example with a multi-processor architecture), if the networking system is replaced by a main frame with a series of terminals, or by any other data processing system with one or more computers.

Figure 2:
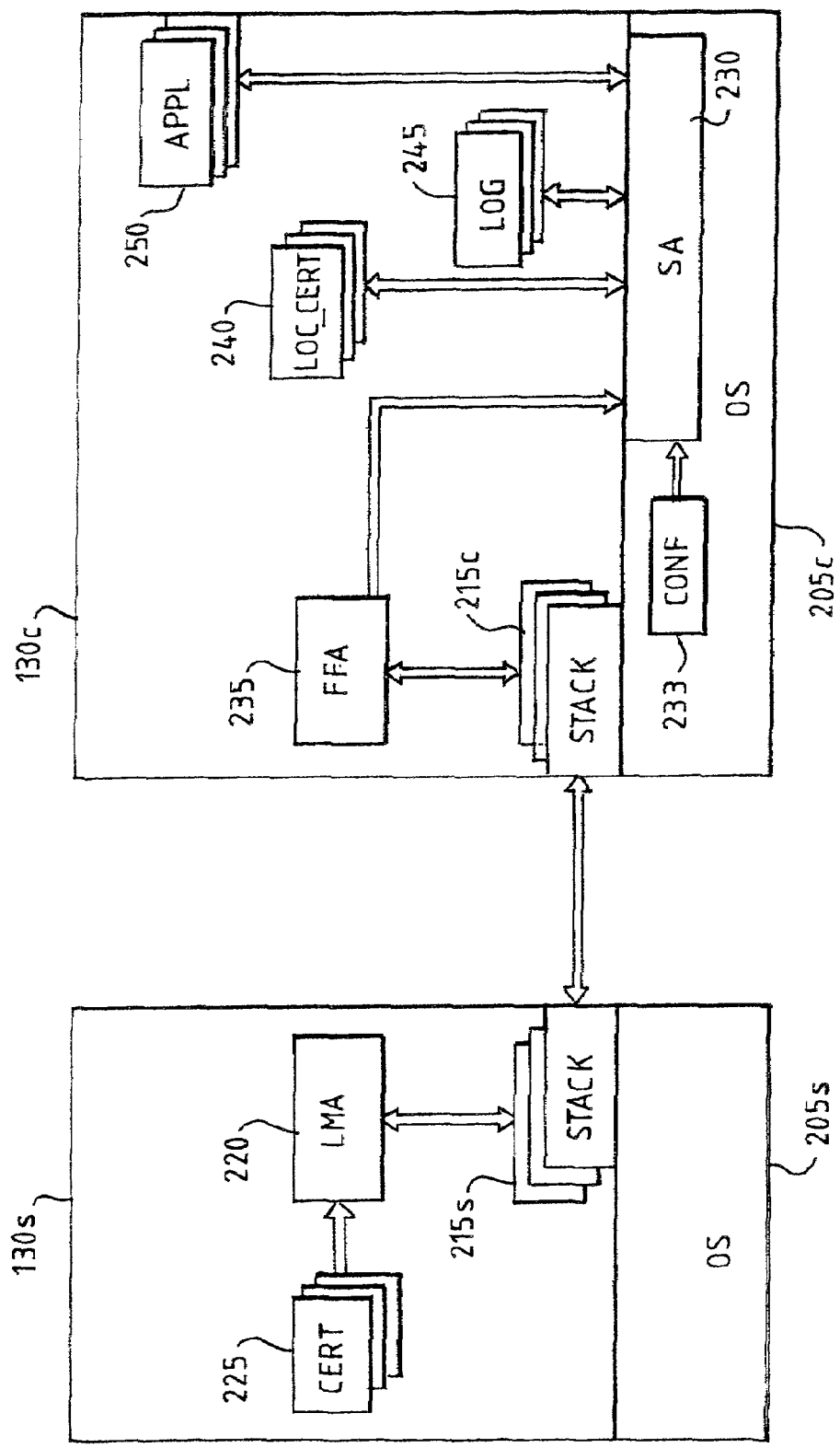
FIG. 2 shows a partial content of a working memory of a client workstation and of a server workstation included in the networking system.

Considering now FIG. 2, there is shown a partial content of the working memory (denoted with 130c) of a workstation operating as a client and of the working memory (denoted with 130s) of a workstation operating as a licensing server; the information (programs and data) is typically stored on the hard-disks and loaded (at least partially) into the working memories 103c,130s when the programs are running. The programs are initially installed onto the hard disks of the client workstation and of the server workstation from CD-ROM.

An operating system (OS) 205c and an operating system 205s provide a software platform for the client workstation and for the server workstation, respectively, on top of which other programs can run; the operating systems 205c,205s perform basic tasks, such as recognising input from the keyboard, sending output to the monitor, keeping track of files on the hard-disk, and so on. A main module of each operating system 205c,205s (known as kernel) is resident in the respective working memory 103c,130s. The kernel provides all the essential services required by other parts of the operating system 205c,205s (such as loading programs into the working memory, scheduling processes, or interpreting commands). A stack (STACK) 215c and a stack 215s process a set of network protocol layers working together for defining communication over the networking system. Particularly, the stacks 215c,215s allow the client workstation and the server workstation to exchange messages between them.

A licensing management application (LMA) 220 controls a database of digital license certificates (CERT) 225 stored on the server workstation. A different license certificate 225 is employed to authorise use of each software program running on the networking system. The license certificate 225 includes an identifier of the certificate, an identifier of a publisher of the program, conditions of use of the program as authorised by the publisher, and exceptional conditions of use (outside the authorised ones) under which the program can still run.

For example, the authorised conditions of use of the program defines the maximum power of the CPU or the maximum capacity of the working memory of the workstation on which the program can run, the maximum number of end-users allowed to run the program simultaneously, and the like. Moreover, the publisher exceptionally allows the program to run even when the actual conditions of use exceed the authorised ones of a pre-set percentage (such as 10%); for example, if the program is authorised to run on a workstation with a maximum power of the CPU equal to 100 MIPS, the program is still allowed to run (under the exceptional conditions of use) even if the power of the CPU increases up to 110 MIPS.

Each license certificate 225 is created by the publisher and signed using a corresponding private key; the digital signature and a digital certificate associated with the publisher are attached to the license certificate 225. The licensing management application 220 can then extract a public key of the publisher from the corresponding digital certificate, and verify the digital signature in order to validate the license certificate 225.

A (lightweight) licensing system agent (SA) 230 is part of the kernel of the operating system 205c on the client workstation; the system agent 230 provides a basic operation (consisting of very small and well-defined tasks) of a licensing management system. The system agent 230 accesses a data structure (CONF) 233 inside the kernel, which stores information on a configuration of the client workstation (such as the power of the CPU, the capacity of the working memory, and the like); the configuration information 233 defines an execution environment of the programs running on the client workstation.

A full-function licensing agent (FFA) 235 is a daemon process further active on the client workstation, which provides a complete operation of the licensing management system. The full-function agent 235 communicates with the system agent 230 and with the stack 215c (for exchanging messages with the server workstation).

The system agent 235 controls a repository of local digital license certificates (LOC_CERT) 240. Each local license certificate 240 includes a simplified copy of the corresponding license certificate 225 (stored on the server workstation). Particularly, the local license certificate 240 simply consists of an identifier of the corresponding program that is authorised to run on the client workstation. The system agent 230 further controls a log structure (LOG) 245 storing requests of authorisation or release received from the basic programs (operating system 205c and stack 215c). Application programs 250, running on top of the operating system 205c, further communicates with the system agent 230 for sending respective requests of authorisations or release.

Likewise considerations apply if the programs and data are structured in a different manner, if other modules or functions are provided, if different conditions of use are envisaged, if the programs are not allowed to run outside the authorised conditions of use, if one or more different programs providing basic services for the client workstation are provided (down to the operating system alone), and so on.

Figure 3A:
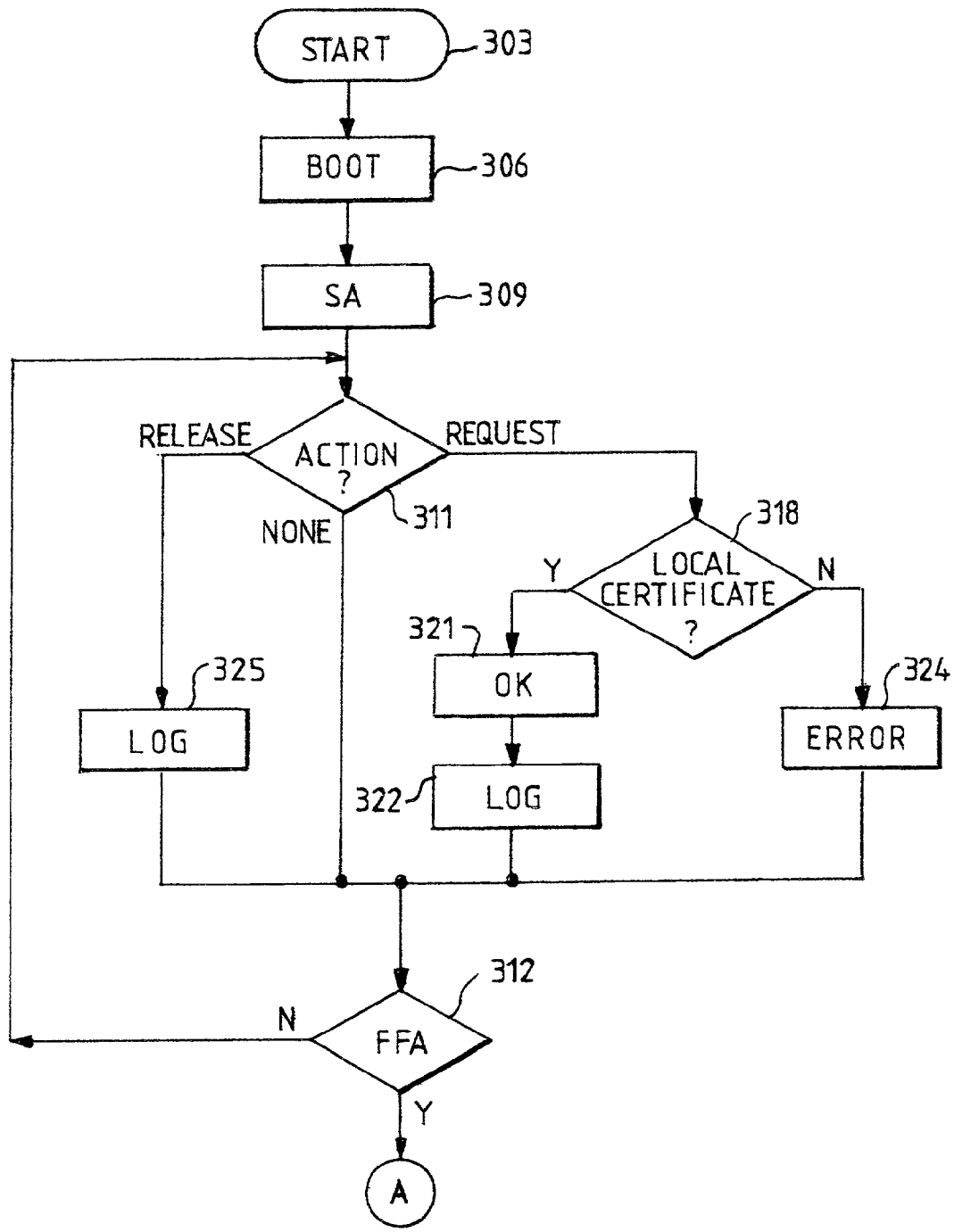
FIGS. 3a–3c are a flow chart of a method for controlling use of software programs on the client workstation.
Figure 3B:
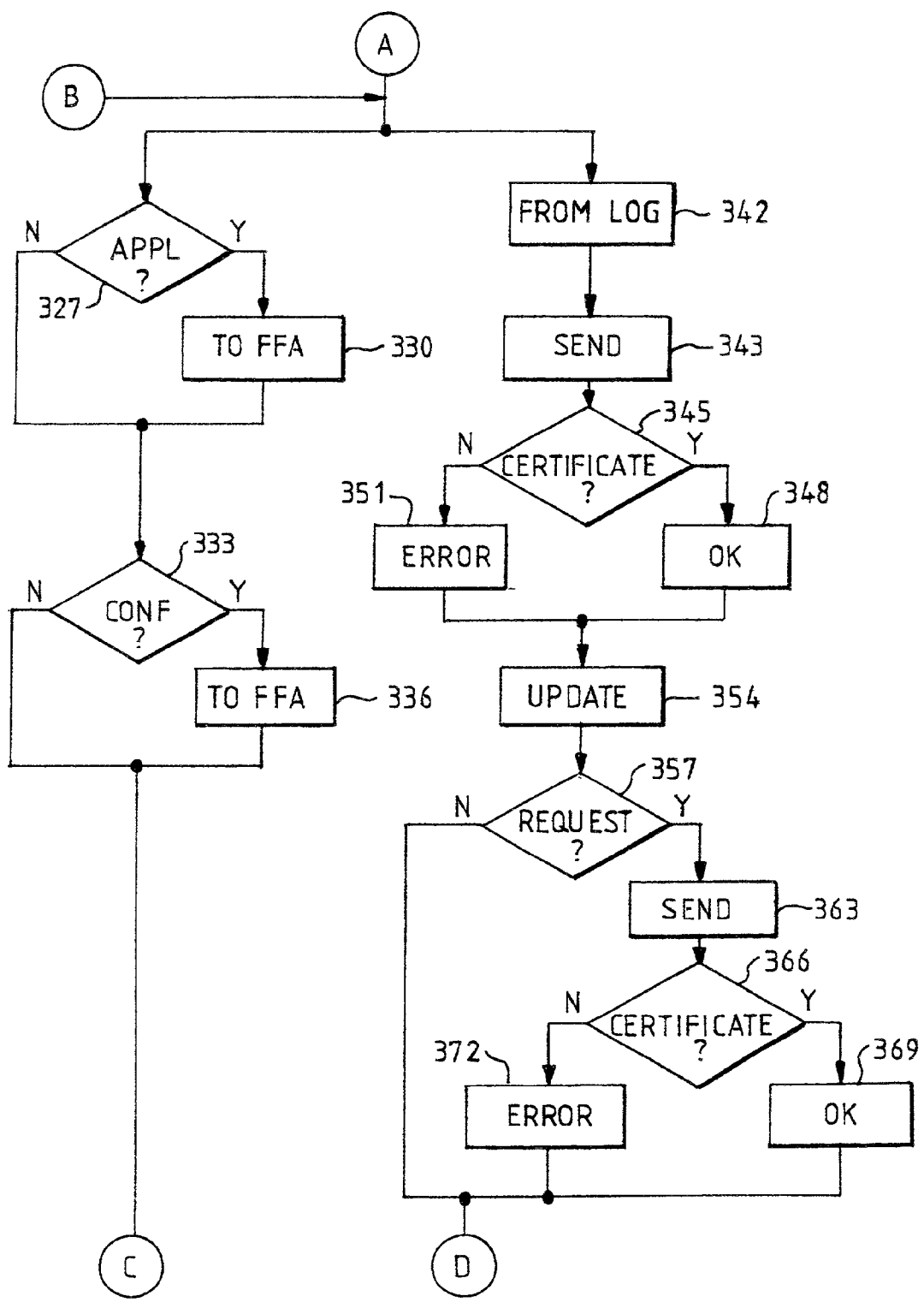
Figure 3C:
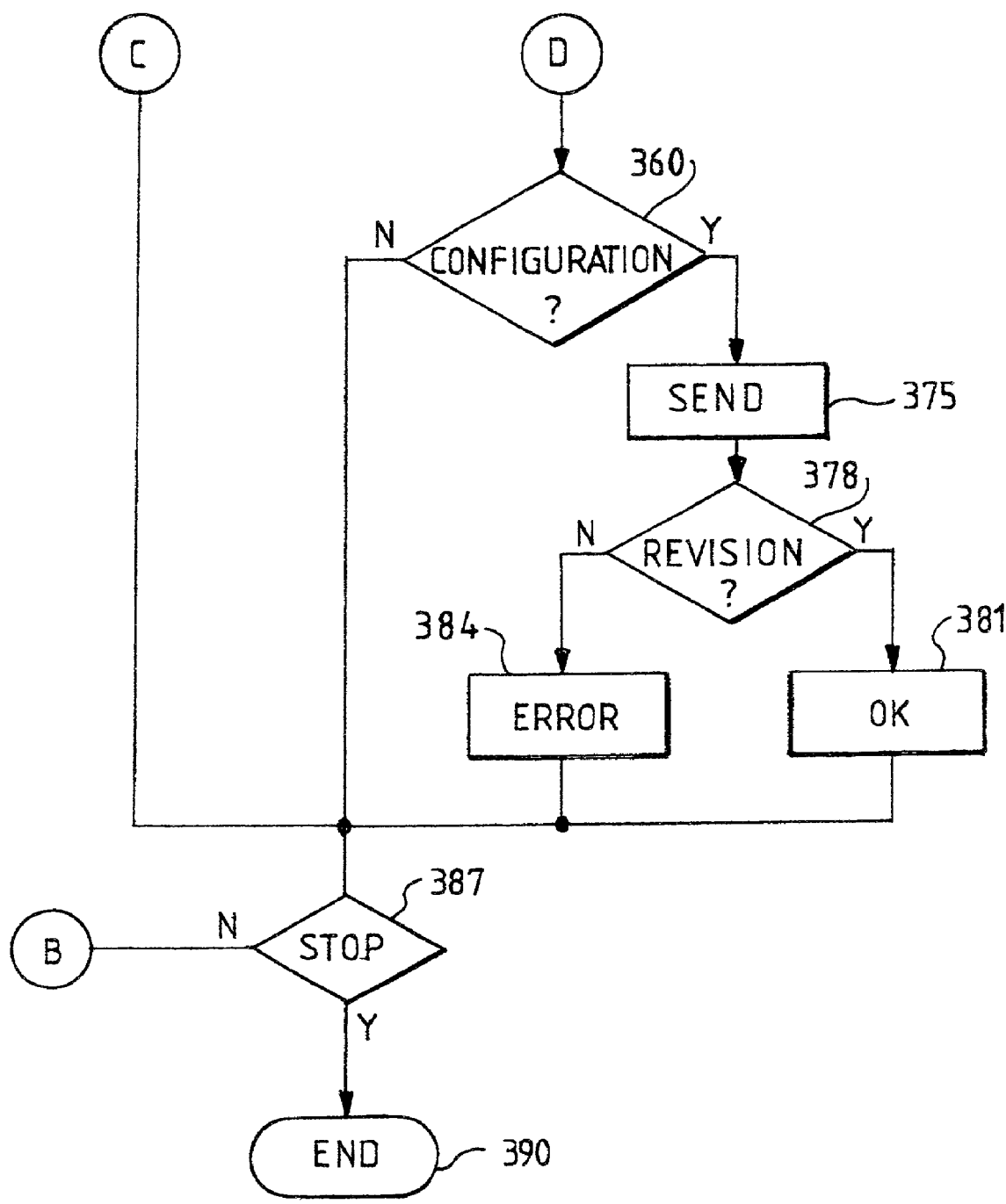

As shown in FIGS. 3a–3c, a series of routines, which together make up a method 300, are performed at successive stages in time in order to control usage of the programs installed on the client workstation. The method 300 starts at block 303 and then passes to block 306, wherein the client workstation is turned on. As a consequence, the CPU loads the basic program stored in the ROM memory (after stabilization of an internal power supply); the basic program performs a test of the installed hardware and initialises the client workstation. The basic program then identifies a peripheral unit storing a boot code for starting the operating system; this code takes over the basic program and starts a bootstrap process. The bootstrap involves loading utilities providing essential services for the client workstation, which in turn control loading and execution of the rest of the operating system and of the other basic programs (such as the network stack) as the bootstrap progresses.

Continuing to block 309, the system agent of the licensing management system is loaded during the bootstrap (as part of the kernel of the operating system). The system agent checks at block 311 whether a basic program (that is the operating system or the network stack in the example at issue) has been started or terminated during the bootstrap.

If no action has been notified to the system agent, the method descends into block 312 (described in the following). Conversely, when a basic problem starts it requests an execution authorisation to the system agent (after a loading of the system agent has been completed). As a consequence, the system agent verifies the repository of the local license certificates at block 318. If a local license certificate for the basic program is found (indicating that the basic program is authorised to run), the system agent enables execution of the basic program at block 321, and then logs the request of authorisation at block 322; conversely, the execution of the basic program is aborted, and the method enters an error condition at block 324 (which is typically logged for further analysis). In both cases, the method continues to block 312. When a basic program terminates its execution (block 311), the basic program notifies the system agent accordingly (before terminating). As a consequence, the system agent logs a corresponding request of release at block 325 and then descends into block 312.

Considering now block 312, once the bootstrap has been terminated, the full-function agent is loaded; as soon as the loading of the full-function agent is completed, the system agent is notified accordingly. If the system agent has not been notified of the loading of the full-function agent yet, the method returns to block 311 for repeating the steps described above. Conversely, the method forks into two branches that are executed in parallel. A first branch consists of blocks 327–336, and a second branch consists of blocks 342–384; the two branches joint at block 387 (described in the following).

Considering now block 327, the system agent checks whether an application program has been started or terminated. If so, the system agent transfers the corresponding request of authorisation or release to the full-function agent at block 330, and the method then passes to block 333; conversely, the method descends into block 333 directly. Considering now block 333, the system agent verifies whether a change in the configuration information defining the execution environment of the (basic and application) programs running on the client workstation has occurred. If so, the new configuration information is provided to the full-function agent at block 336, and the method then proceeds to block 387; conversely, the method descends into block 387 directly.

At the same time, at block 342, the requests of authorisation or release from the basic programs stored during the bootstrap are extracted from the log structure by the system agent and provided to the full-function agent. The requests so obtained are sent to the server workstation at block 343 (through the respective network stacks), together with the configuration information defining the corresponding execution environment. Continuing to block 345, the licensing management application on the server workstation verifies compliance of each request with the authorised conditions of use contained in the respective license certificate. If a license certificate matching the basic program is found, and if the basic program is running within the conditions of use authorised by the publisher (for example if the power of the CPU does not exceed the maximum value allowed) the authorisation (previously granted by the system agent) is confirmed at block 348; conversely, the method enters an error condition at block 351 (which is logged for further analysis). In both cases, a corresponding response message is sent to the full-function agent; typically, the response message includes a return code specifying whether the authorisation has been granted or refused, and in the latter case the reason of the refusal; moreover, a status code further specifies if the granted authorisation falls within the (standard) conditions of use or within the exceptional conditions of use, or further specifies the reason of the refusal in greater detail.

The method then enters block 354 (both from block 348 and from block 351), wherein a new version of the local license certificates for the basic programs is generated from the respective license certificates stored on the server workstation. The new version of the local license certificates is sent from the licensing management application to the full-function agent on the client workstation; the full-function agent in turn causes the system agent to updates the repository of the local license certificates accordingly.

The method then descends into block 357, wherein the full-function agent checks whether a request of authorisation or release has been required by an application program (through the system agent). If not, the method passes to block 360 (described in the following). Conversely, the request is sent to the server workstation at block 363 for updating corresponding licensing information. Proceeding to block 366, if the application program has required an execution authorisation the licensing management application verifies compliance of the request with the authorised conditions of use contained in the respective license certificate. If the result of the verification is positive, the authorisation is granted at block 369; conversely the method enters an error condition at block 372. In both cases, a corresponding response message (return code and status code) is sent to the full-function agent; the response message is in turn sent to the system agent and then returned to the application program requesting the authorisation, which continues or aborts its execution accordingly.

The method passes to block 360 (both from block 369 and from block 372), wherein the full-function agent verifies whether new configuration information has been received from the system agent. If not, the method descends into block 387 directly. Conversely, the new configuration information is sent to the server workstation at block 375. Passing to block 378, the licensing management application revises each granted authorisation in the light of the new configuration information. If the running of each (basic and application) program still complies with the authorised conditions of use contained in the respective license certificate, the authorisation is confirmed at block 381; conversely, the method enters an error condition at block 384. In both cases, a corresponding response message is sent to the full-function agent, and the method continues to block 387.

Considering now block 387, a check is made whether the client workstation has been shut down. If not, the method returns to the fork point after block 312 (for repeating the steps described above). On the contrary, the method ends at the final block 390.

Likewise considerations apply if an equivalent method is performed, for example with a warm bootstrap (wherein the client workstation is reset) instead of a cold bootstrap (wherein the client workstation is turned on from an off position), if execution of the program is disabled when an error occurs, if the response message has a different structure, and so on.

More generally, the present invention provides a method of controlling use of software programs on a computer including the steps of starting a bootstrap involving loading one or more software programs providing basic services for the computer, and requesting an execution authorisation by each program to a licensing management system; the method further includes the steps of granting the authorisation according to a preliminary verification of licensing information indicative of an authorised condition of use of the program before completion of the bootstrap, and revising the granted authorisation according to a complete verification of the licensing information after completion of the bootstrap.

The solution of the invention makes it possible to implement a complete control of the programs running on the computer.

Particularly, the proposed method allows an effective monitoring (by the licensing management system) of the valuable programs that are loaded during the bootstrap process (such as the operating system and the network stack). In fact, in the solution described above the use of the programs may be controlled even before the full function of the operating system is available.

The solution according to the present invention allows the publisher to protect his of her intellectual property rights in an effective manner; in fact, any unaccounted use of both the basic programs and the application programs is prevented, avoiding any economic loss due to unpaid royalties. Alternatively, the information so colleted is employed by the publisher only for recording the real use of the programs made by the customer; for example, this information may be advantageously used for marketing or statistical applications.

The preferred embodiment of the invention described above offers further advantages. For example, the provision of the system agent and of the full-function agent (with the corresponding log structure) makes the implementation of the licensing management system very simple; In this way, the process of the invention is completely transparent to the (basic and application) programs requiring the respective execution authorisation to the licensing management system. Moreover, the feature of deferring the request of authorisation until completion of the loading of the lightweight agent allows even programs that are started very early during the bootstrap to be monitored; particularly, this solution makes it possible to control use of the kernel of the operating system itself.

Similar considerations apply if the licensing management system is partitioned into equivalent basic and full modules, if the stored requests of authorisation or release (from the basic programs) are provided to the full-function agent in a different manner (for example if they are extracted from the log structure directly), if only requests of authorisation are logged (for example if the basic programs cannot be terminated before completion of the bootstrap), if the authorisations are requested to the system agent from the basic programs later on, and the like. However, the solution of the invention leads itself to be implemented even with a licensing management system consisting of a single module (which performs both a preliminary verification and a complete verification of the license certificates), or by logging each authorisation requested before the loading of the system agent for a later verification.

The solution of the invention is particularly advantageous in a networking system, wherein license certificates for the programs running on the client workstations are stored on the server workstation. In this way, the use of the programs can be controlled even before a communication facility provided by the network stack is available. Preferably, the authorisations are granted according to a verification of respective local license certificates stored on the client workstation; this feature makes the verification of the request particularly simple and fast (and then suitable for execution during the bootstrap). Moreover, the local license certificates are continually replaced with the respective new versions (received from the server workstation) after each bootstrap; this ensures that the local license certificates stored on the client workstation are always up to date, as far as possible.

Likewise considerations apply if the client workstation and the server workstation communicate in a different manner, if computers of different type are used, if the license certificates and the local license certificates contain different information (for example an expiration date), if the local license certificates are updated with a different frequency (for example every two or more bootstraps, or periodically), and so on.

Alternatively, the license certificates and the local license certificates are replaced by equivalent licensing information indicative of the authorised conditions of use of the programs, the authorisation is granted according to a different preliminary verification of the licensing information and it is revised according to a different complete verification of the licensing information; however, the method of the invention leads itself to be used even in a single computer, without any updating of the local license certificates, and even without any local license certificate (for example simply checking the presence of the license certificates on the computer before completion of the bootstrap and verifying the authorised conditions of use after completion of the bootstrap).

Preferably, the operation of the client workstation on which the programs are running is monitored for detecting any change in the execution environment of the programs; this information is used to revise the granted authorisations accordingly. In this way, it is possible to track use of the programs dynamically. For example, if the client workstation allows the power of the CPU to be changed during operation, the devised solution makes it possible to have licensing information always perfectly aligned with the actual conditions of use of the programs.

Similar considerations apply if different configuration parameters are considered, if operation of the client workstation is monitored in a different manner (for example with a dedicated further agent), if the granted authorisations are revised with a different frequency (for example periodically), and the like. However, the solution of the invention leads itself to be implemented even without any monitoring of the execution environment of the programs.

Advantageously, the method proposed by the present invention is implemented with a computer program, which is provided on CD-ROM.

Alternatively, the program is provided on floppy-disk, is pre-loaded onto the hard-disk, or is stored on any other computer readable medium, is sent to the computer through the network, is broadcast, or more generally is provided in any other form directly loadable into a working memory of the computer. However, the method according to the present invention leads itself to be carried out even with a hardware structure installed on the client workstation, for example integrated in a chip of semiconductor material.

It should be noted that the additional feature of monitoring operation of the computer is suitable to be used (alone or combined with the other additional features) even without the preliminary and complete verification of the licensing information described above.

More generally, the present invention further provides a method of controlling use of software programs on a computer including the steps of requesting an execution authorisation by each program to a licensing management system, and granting the authorisation according to a verification of licensing information indicative of an authorised condition of use of the program; the method further includes the steps of monitoring operation of the computer for detecting a change in an execution environment of the program, and revising the granted authorisation according to the detected change.

For example, in a licensing management system that does not allow use of the basic programs (such as the operating system) to be controlled, this feature is advantageously employed to track use of the application programs dynamically.

Naturally, in order to satisfy local and specific requirements, a person skilled in the art may apply to the solution described above many modifications and alterations all of which, however, are included within the scope of protection of the invention as defined by the following claims.

What is claimed is:

1. A method comprising:
   starting a bootstrap process in a client computer;
   before the bootstrap process is completed, requesting an authorization for a program to load on the client computer, the authorization being determined by verifying that a simplified local license certificate for the program is stored on the client computer, the simplified local license certificate being only an identifier of a corresponding full license certificate that is remotely stored on a server computer; and
   upon a determination that the simplified local license certificate is stored on the client computer, completing execution of the bootstrap and revising the simplified local license certificate according to the full license certificate stored on the server computer, wherein the simplified local license certificate is based on an operating execution environment of the client computer, and wherein a Central Processing Unit (CPU) in the client computer is currently executing instructions at or below a pre-determined maximum instruction execution rate in order for revision of the simplified local license certificate to be authorized.

2. The method of claim 1, wherein the simplified local license certificate is revised according to changes in hardware installed on the client computer.

3. The method of claim 1, wherein the simplified local license certificate is revised according to changes in software loaded on the client computer.

4. The method of claim 1, wherein the program is allowed to continue to execute when the CPU is operating up to a pre-determined percentage over the maximum authorized power.

5. The method of claim 1, wherein the local license certificate is not time based.

6. The method of claim 1, wherein the program is an operating system.

7. The method of claim 1, wherein the program is a network stack.

8. A machine-readable medium having a plurality of instructions processable, by a machine embodied therein, wherein the plurality of instructions, when processed by the machine causes the machine to perform a method that comprises:
   starting a bootstrap process in a client computer;
   before the bootstrap process is completed, requesting an authorization for a program to load on the client computer, the authorization being determined by verifying that a simplified local license certificate for the program is stored on the client computer, the simplified local license certificate being only an identifier of a corresponding full license certificate that is remotely stored on a server computer; and
   upon a determination that the simplified local license certificate is stored on the client computer, completing execution of the bootstrap and revising the simplified local license certificate according to the full license certificate stored on the server computer, wherein the simplified local license certificate is based on an operating execution environment of the client computer, and wherein a Central Processing Unit (CPU) in the client computer is currently executing instructions at or below a pre-determined maximum instruction execution rate in order for revision of the simplified local license certificate to be authorized.

9. The machine-readable medium of claim 8, wherein the simplified local license certificate is revised according to changes in hardware installed on the client computer.

10. The machine-readable medium of claim 8, wherein the simplified local license certificate is revised according to changes in software loaded on the client computer.

11. The machine-readable medium of claim 8, wherein the local license certificate is not time based.

12. The machine-readable medium of claim 8, wherein the program is an operating system.

13. The machine-readable medium of claim 8, wherein the program is a network stack.

14. The machine-readable medium of claim 8, wherein the program is allowed to continue to execute when the CPU is operating up to a pre-determined percentage over the maximum authorized power.

15. A system comprising:
   means for starting a bootstrap process in a client computer;
   means for, before the bootstrap process is completed, requesting an authorization for a program to load on the client computer, the authorization being determined by verifying that a simplified local license certificate for the program is stored on the client computer, the simplified local license certificate being only an identifier of a corresponding full license certificate that is remotely stored on a server computer; and
   means for, upon a determination that the simplified local license certificate is stored on the client computer, completing execution of the bootstrap and revising the simplified local license certificate according to the full license certificate stored on the server computer, wherein the simplified local license certificate is based on an operating execution environment of the client computer, and wherein a Central Processing Unit (CPU) in the client computer is currently executing instructions at or below a pre-determined maximum instruction execution rate in order for revision of the simplified local license certificate to be authorized.

16. The system of claim 15, wherein the simplified local license certificate is revised according to changes in hardware installed on the client computer.

17. The system of claim 15, wherein the simplified local license certificate is revised according to changes in software loaded on the client computer.

18. The system of claim 15, wherein the program is allowed to continue to execute when the CPU is operating up to a pre-determined percentage over the maximum authorized power.

19. The system of claim 15, wherein the local license certificate is not time based.

20. The system of claim 15, wherein the program is an operating system.

21. The system of claim 15, wherein the program is a network stack.

* * * * *